(12) United States Patent
Li et al.

(10) Patent No.: US 11,303,897 B2
(45) Date of Patent: Apr. 12, 2022

(54) METHOD AND APPARATUS FOR SIGNALING OF CHROMA QUANTIZATION PARAMETERS

(71) Applicant: TENCENT AMERICA LLC, Palo Alto, CA (US)

(72) Inventors: Ling Li, Seoul (KR); Xiang Li, Saratoga, CA (US); Shan Liu, San Jose, CA (US)

(73) Assignee: TENCENT AMERICA LLC

(*) Notice: Subject to any disclaimer, the term of this patent is extended or adjusted under 35 U.S.C. 154(b) by 0 days.

(21) Appl. No.: 17/094,398

(22) Filed: Nov. 10, 2020

(65) Prior Publication Data
US 2021/0266550 A1   Aug. 26, 2021

Related U.S. Application Data

(60) Provisional application No. 62/981,356, filed on Feb. 25, 2020.

(51) Int. Cl.
| | |
|---|---|
| *H04N 19/00* | (2014.01) |
| *H04N 19/124* | (2014.01) |
| *H04N 19/186* | (2014.01) |
| *H04N 19/172* | (2014.01) |
| *H04N 19/184* | (2014.01) |
| *H04N 19/70* | (2014.01) |

(52) U.S. Cl.
CPC ......... *H04N 19/124* (2014.11); *H04N 19/172* (2014.11); *H04N 19/184* (2014.11); *H04N 19/186* (2014.11); *H04N 19/70* (2014.11)

(58) Field of Classification Search
CPC .. H04N 19/124; H04N 19/172; H04N 19/184; H04N 19/186; H04N 19/70
See application file for complete search history.

(56) References Cited

U.S. PATENT DOCUMENTS

| | | | |
|---|---|---|---|
| 2015/0071345 A1* | 3/2015 | Tourapis | H04N 19/186 375/240.03 |
| 2019/0320174 A1* | 10/2019 | Ramasubramanian | H04N 19/126 |
| 2020/0413059 A1* | 12/2020 | Han | H04N 19/186 |
| 2021/0006792 A1* | 1/2021 | Han | H04N 19/176 |
| 2021/0092460 A1* | 3/2021 | Chen | H04N 19/159 |
| 2021/0099732 A1* | 4/2021 | Ray | H04N 19/593 |
| 2021/0136368 A1* | 5/2021 | Zhang | H04N 19/82 |
| 2021/0136419 A1* | 5/2021 | Hsiang | H04N 19/174 |
| 2021/0144409 A1* | 5/2021 | Zhang | H04N 19/184 |

* cited by examiner

*Primary Examiner* — Zhihan Zhou
(74) *Attorney, Agent, or Firm* — Arentfox Schiff LLP

(57) ABSTRACT

According to an aspect of the disclosure, a method of video decoding performed in a video decoder is provided. In the method, syntax information of a coding unit (CU) is decoded from a coded video bitstream. The syntax information is signaled in a picture header (PH) and includes chroma quantization parameter (QP) offsets in a PH level. The chroma QP offsets include at least one of a Cb offset, a Cr offset, and a CbCr offset. Further, quantization parameters for the CU are determined based on the chroma QP offsets in the PH level and a quantization parameter range offset of the CU.

20 Claims, 9 Drawing Sheets

METHOD AND APPARATUS FOR SIGNALING OF CHROMA QUANTIZATION PARAMETERS

INCORPORATION BY REFERENCE

This present application claims the benefit of priority to U.S. Provisional Application No. 62/981,356, "SIGNALING OF CHROMA QUANTIZATION PARAMETERS" filed on Feb. 25, 2020, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, the two standard organizations jointly formed the JVET (Joint Video Exploration Team) to explore the potential of developing the next video coding standard beyond HEVC. In October 2017, the two standard organizations issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team. VTM 7 is a version of VTM (VVC Test Model). In the following, the term quantization matrix is the same as scaling matrix.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 gigabytes (GB) of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

The present disclosure includes embodiments related to next-generation video coding technologies beyond HEVC (High Efficiency Video Coding), e.g., Versatile Video Coding (VVC). In the present disclosure, methods for signaling a quantization parameter are provided.

According to an aspect of the disclosure, methods and apparatus for video decoding performed in a video decoder are provided. In the method, syntax information of a coding unit (CU) can be decoded from a coded video bitstream. The syntax information can be signaled in a picture header (PH) and include chroma quantization parameter (QP) offsets in a PH level, where the chroma QP offsets can include at least one of a Cb offset, a Cr offset, and a CbCr offset. Further, quantization parameters for the CU can be determined based on the chroma QP offsets in the PH level and a quantization parameter range offset of the CU.

In some embodiments, the syntax information can be signaled in the picture header (PH) in response to a chroma array type not being equal to zero.

In order to determine the quantization parameters for the CU, a Cb component of an initial quantization parameter of the CU can be obtained. A Cr component of the initial quantization parameter of the CU can be obtained. A Cb component of a quantization parameter offset of the CU in a picture parameter set (PPS) level can be obtained. A Cr component of the quantization parameter offset of the CU in the PPS level can be obtained. A Cb component of a quantization parameter offset of the CU in a slice header (SH) level can be obtained. A Cr component of the quantization parameter offset of the CU in the SH level can be obtained. A Cb component of a coding unit quantization parameter offset of the CU can be obtained. A Cr component of the coding unit quantization parameter offset of the CU can be obtained.

Further, a Cb quantization parameter of the quantization parameters can be determined based on the QP offsets in the PH level and the quantization parameter range offset of the CU. The Cb quantization parameter can be equal to a sum of a joint Cb offset and the quantization parameter range offset. The joint Cb offset can be determined based on a sum of the chroma QP offsets in the PH level, the Cb component of the initial quantization parameter of the CU, the Cb component of the quantization parameter offset of the CU in the PPS level, the Cb component of the quantization parameter offset of the CU in the SH level, and the Cb component of the coding unit quantization parameter offset of the CU. The joint Cb offset can be larger than or equal to a negative quantization parameter range offset and be less than or equal to 63.

In addition, a Cr quantization parameter of the quantization parameters can be determined based on the QP offsets in the PH level and the quantization parameter range offset of the CU. The Cr quantization parameter can be equal to a sum of a joint Cr offset and the quantization parameter range offset. The joint Cr offset can be determined based on a sum of the Cr offset of the chroma QP offsets in the PH level, the Cr component of the initial quantization parameter of the CU, the Cr component of the quantization parameter offset of the CU in the PPS level, the Cr component of the quantization parameter offset of the CU in the SH level, and the Cr component of the coding unit quantization parameter offset of the CU, where the joint Cr offset can be larger than or equal to a negative quantization parameter range offset and be less than or equal to 63.

In some embodiments, a CbCr quantization parameter of the CU can be determined. A CbCr quantization parameter offset of the CU in a picture parameter set (PPS) level can be obtained. A CbCr quantization parameter offset of the CU in a slice header (SH) level can be obtained. A CbCr coding unit quantization parameter offset of the CU can be obtained.

In the method, a CbCr quantization parameter of the quantization parameters can be determined based on the QP offsets in the PH level and the quantization parameter range offset of the CU. The CbCr quantization parameter can be equal to a sum of a joint CbCr offset and the quantization parameter range offset. The joint CbCr offset can be determined based on a sum of the CbCr offset of the chroma QP offsets in the PH level, the CbCr quantization parameter of the CU, the CbCr quantization parameter offset of the CU in the PPS level, the CbCr quantization parameter offset of the CU in the SH level, and the CbCr coding unit quantization parameter offset of the CU. The joint CbCr offset can be larger than or equal to a negative quantization parameter range offset and be less or equal to 63.

In some embodiments, a sum of the Cb component of the quantization parameter offset of the CU in the PPS level and the Cb offset of the chroma QP offsets in the PH level can be in a range of −12 and +12 In addition, a sum of the Cr component of the quantization parameter offset of the CU in the PPS level and the Cr offset of the chroma QP offsets in the PH level can be in a range of −12 and +12. A sum of a CbCr quantization parameter offset of the CU in the PPS level and the CbCr offset of the chroma QP offsets in the PH level can be in a range of −12 and +12.

According to another aspect of the disclosure, a method of video decoding performed in a video decoder is provided. In the method, signaling information from a coded video bitstream can be acquired. First syntax information of a coding unit (CU) from the coded video bitstream can be decoded in response to the signaling information being a first value. The first syntax information can be signaled in a picture header (PH) and include chroma quantization parameter (QP) offsets in a PH level. The chroma QP offsets in the PH level can include at least one of a Cb offset, a Cr offset, and a CbCr offset. Quantization parameters for the CU can be subsequently determined based on the QP offsets in the PH level and a quantization parameter range offset of the CU.

In some embodiments, second syntax information of the CU can be decoded from the coded video bitstream in response to the signaling information being a second value. The second syntax information can be signaled in a slice header (SH) and include chroma quantization parameter (QP) offsets in a SH level. The chroma QP offsets in the SH level can include at least one of a Cb offset, a Cr offset, and a CbCr offset. The quantization parameters for the CU can be further determined based on the QP offsets in the SH level and the quantization parameter range offset of the CU.

In some embodiments, the first syntax information can be signaled in the picture header (PH) in response to a chroma array type not being monochrome or not being a chroma format 4:4;4 with a separate color plane flag equal to 1.

In some embodiments, the second syntax information can be signaled in the SH in response to the chroma array type not being monochrome or not being the chroma format 4:4;4 with the separate color plane flag equal to 1.

In order to determine the quantization parameters for the CU, a Cb component of an initial quantization parameter of the CU can be obtained. A Cr component of the initial quantization parameter of the CU can be obtained. A Cb component of a quantization parameter offset of the CU in a picture parameter set (PPS) level can be obtained. A Cr component of the quantization parameter offset of the CU in the PPS level can be obtained. A Cb component of a coding unit quantization parameter offset of the CU can be obtained. A Cr component of the coding unit quantization parameter offset of the CU can be obtained.

Further, a Cb quantization parameter can be determined based on the QP offsets in the PH level and the quantization parameter range offset of the CU. The Cb quantization parameter can be equal to a sum of a joint Cb offset and the quantization parameter range offset. The joint Cb offset can be determined based on a sum of the Cb offset of the chroma QP offsets in the PH level, the Cb component of the initial quantization parameter of the CU, the Cb component of the quantization parameter offset of the CU in the PPS level, and the Cb component of the coding unit quantization parameter offset of the CU in response to the signaling information being the first value. The joint Cb offset can be larger than or equal to a negative quantization parameter range offset and be less than or equal to 63.

In addition, a Cr quantization parameter can be determined based on the QP offsets in the PH level and the quantization parameter range offset of the CU. The Cr quantization parameter can be equal to a sum of a joint Cr offset and the quantization parameter range offset. The joint Cr offset can be determined based on a sum of the Cr offset of the chroma QP offsets in the PH level, the Cr component of the initial quantization parameter of the CU, the Cr component of the quantization parameter offset of the CU in the PPS level, and the Cr component of the coding unit quantization parameter offset of the CU in response to the signaling information being the first value. The joint Cr offset can be larger than or equal to a negative quantization parameter range offset and be less than or equal to 63.

In the method, a CbCr quantization parameter of the CU can be obtained. A CbCr quantization parameter offset of the CU in a picture parameter set (PPS) level can be obtained. A CbCr coding unit quantization parameter offset of the CU can be obtained.

Moreover, a CbCr quantization parameter can be determined based on the QP offsets in the PH level and the quantization parameter range offset of the CU. The CbCr quantization parameter can be equal to a sum of a joint CbCr offset and the quantization parameter range offset. The joint CbCr offset can be determined based on a sum of the CbCr offset of the chroma QP offsets in the PH level, the CbCr quantization parameter of the CU, the CbCr quantization parameter offset of the CU in the PPS level, and the CbCr coding unit quantization parameter offset of the CU in response to the signaling information being the first value. The joint CbCr offset can be larger than or equal to a negative quantization parameter range offset and being less than or equal to 63.

In some embodiments, a Cb quantization parameter can be determined based on the chroma QP offsets in the SH level and the quantization parameter range offset of the CU. The Cb quantization parameter can be equal to a sum of a joint Cb offset and the quantization parameter range offset. The joint Cb offset can be determined based on a sum of the Cb offset of the chroma QP offsets of the CU in the SH level, the Cb component of the initial quantization parameter of the CU, the Cb component of the quantization parameter offset of the CU in the PPS level, and the Cb component of the coding unit quantization parameter offset of the CU in response to the signaling information being the second value. The joint Cb offset can be larger than or equal to a negative quantization parameter range offset and be less than or equal to 63.

In some embodiments, a Cr quantization parameter can be determined based on the chroma QP offsets in the SH level and the quantization parameter range offset of the CU. The Cr quantization parameter can be equal to a sum of a joint Cr offset and the quantization parameter range offset. The joint Cr offset can be determined based on a sum of the Cr offset of the chroma QP offsets of the CU in the SH level, the Cr component of the initial quantization parameter of the CU, the Cr component of the quantization parameter offset of the CU in the PPS level, and the Cr component of the coding unit quantization parameter offset of the CU in response to being the signaling information being the second value. The joint Cr offset can be larger than or equal to a negative quantization parameter range offset and be less than or equal to 63.

In addition, a CbCr quantization parameter based on the chroma QP offsets in the SH level and the quantization parameter range offset of the CU, wherein: the CbCr quantization parameter is equal to a sum of a joint CbCr offset and the quantization parameter range offset, and the joint CbCr offset can be determined based on a sum of the CbCr offset of the chroma QP offsets of the CU in the SH level, the CbCr quantization parameter of the CU, the CbCr quantization parameter offset of the CU in the PPS level, and the CbCr coding unit quantization parameter offset of the CU in response to the signaling information being the second value. The joint CbCr offset can be larger than or equal to a negative quantization parameter range offset and be less than or equal to 63.

In some examples, the apparatus for video decoding includes receiving circuitry and processing circuitry that is configured to perform one or more of the methods described above.

Aspects of the disclosure also provide non-transitory computer-readable mediums storing instructions which when executed by a computer for video decoding cause the computer to perform one or more of the methods described above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
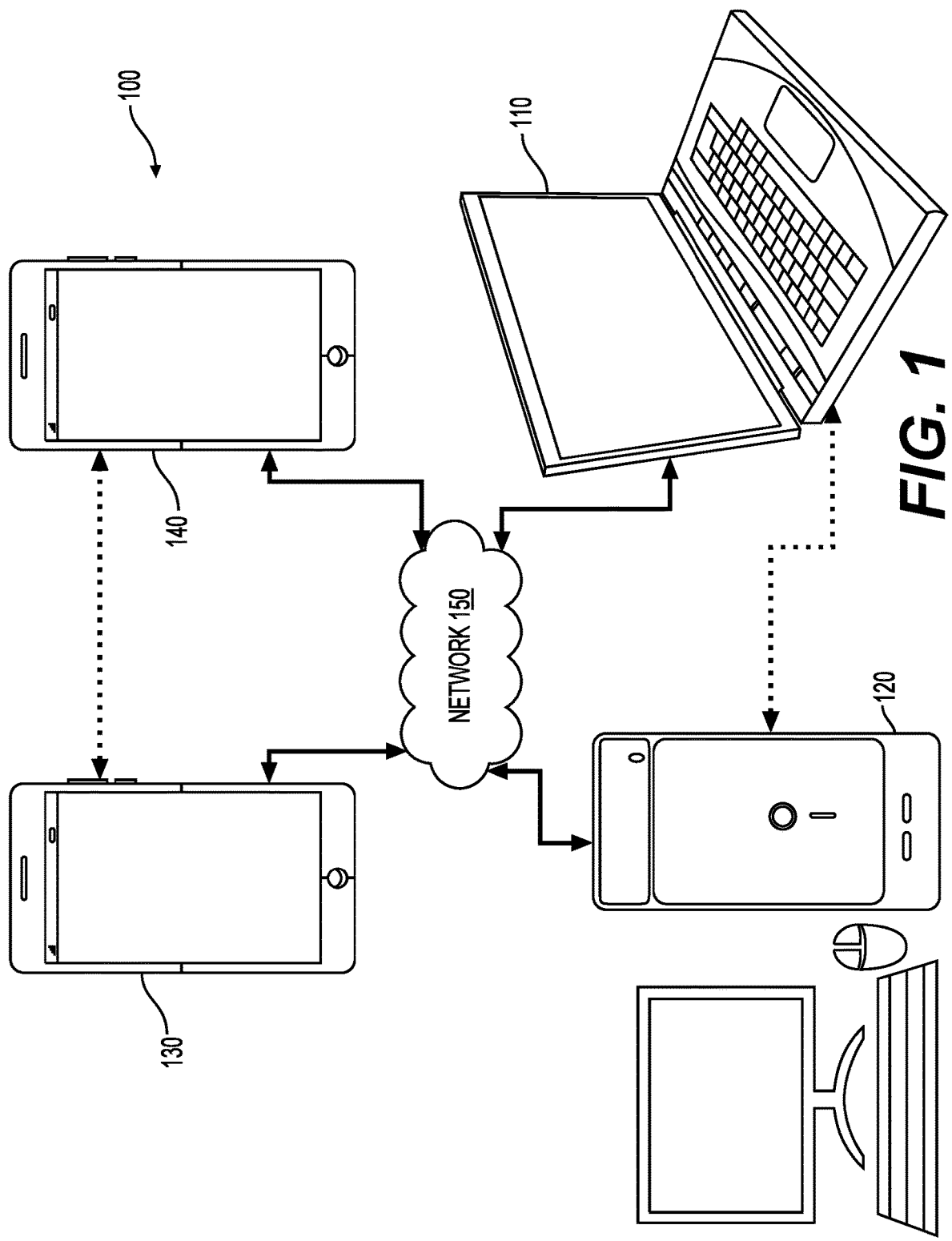
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
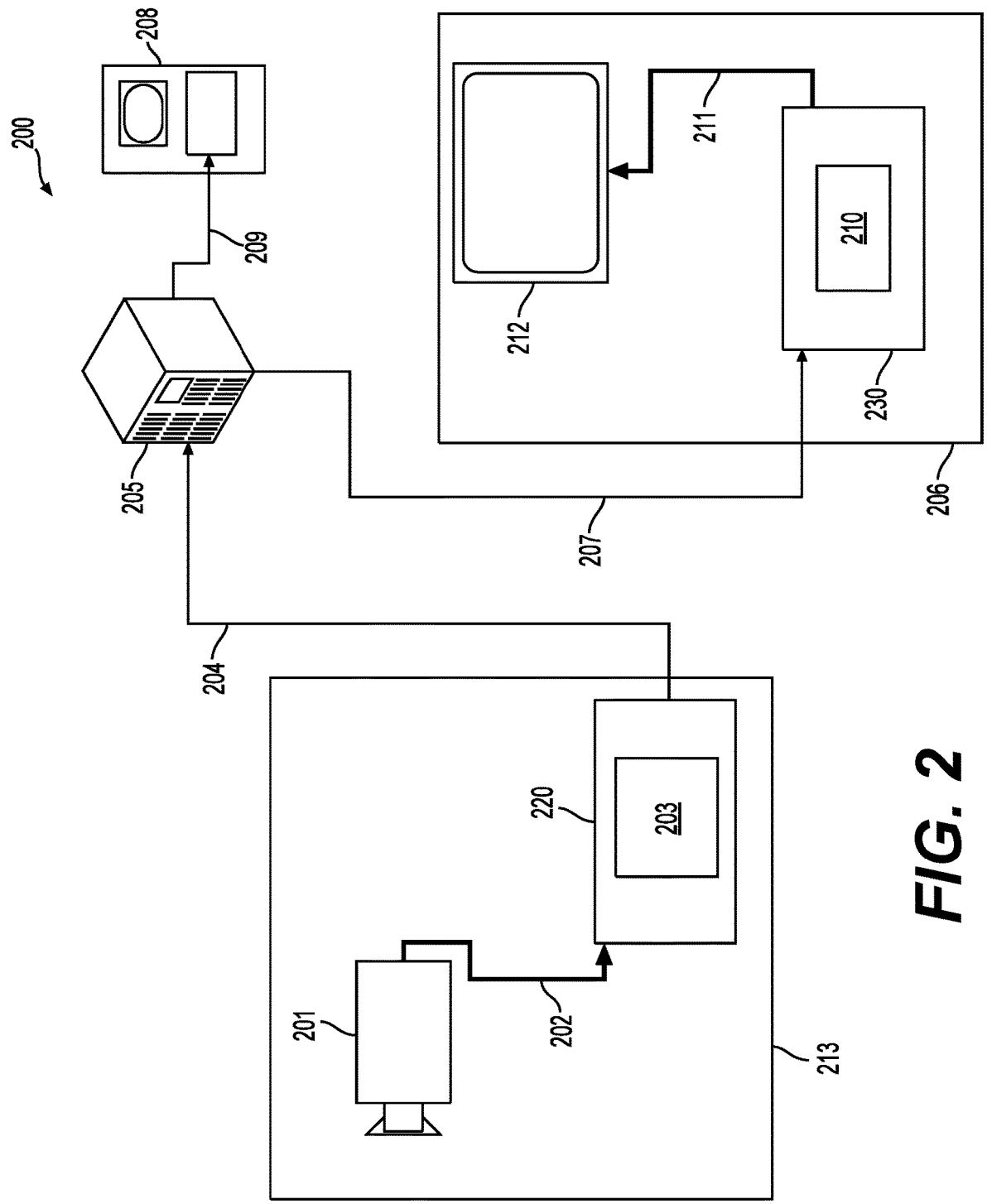
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
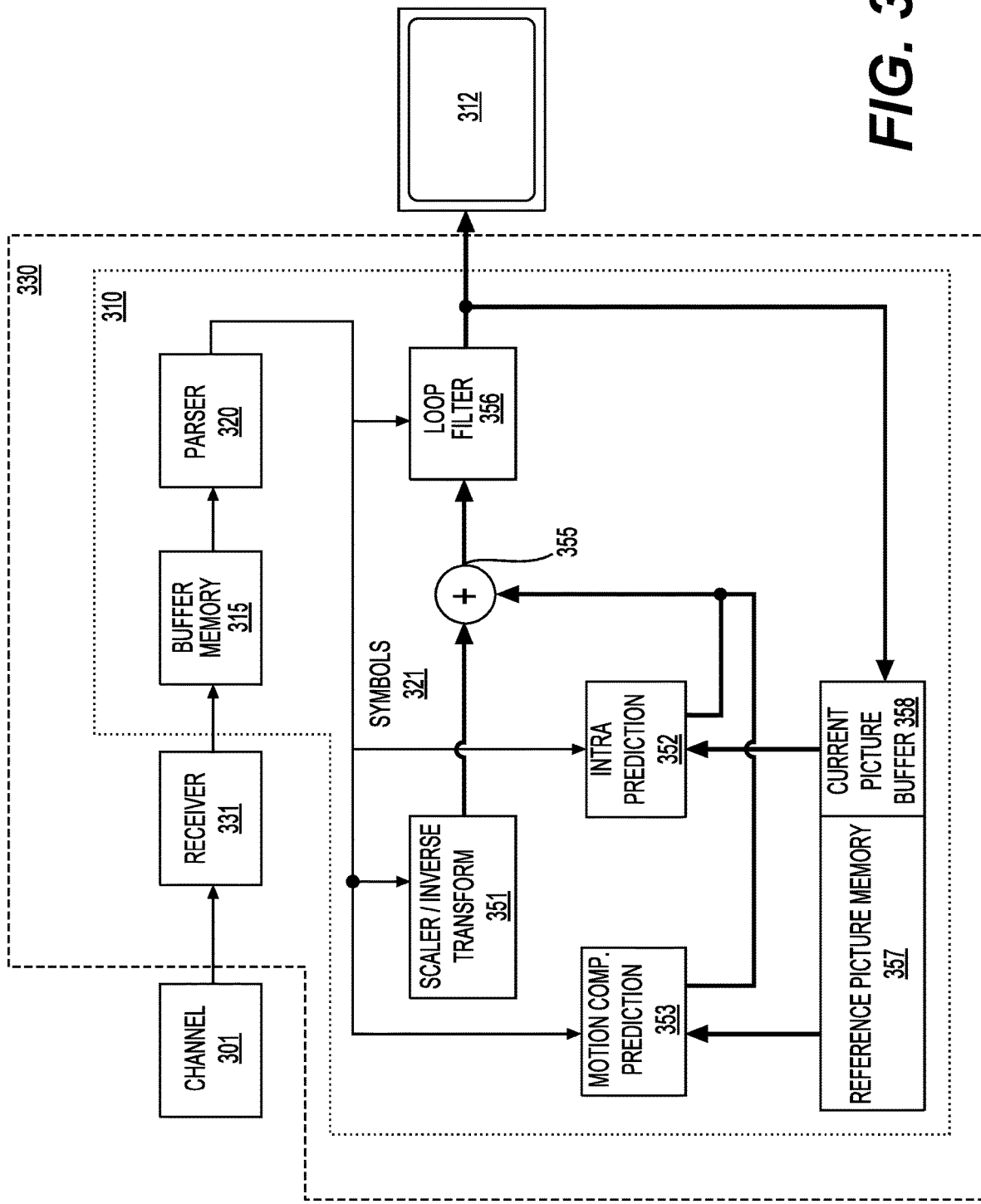
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
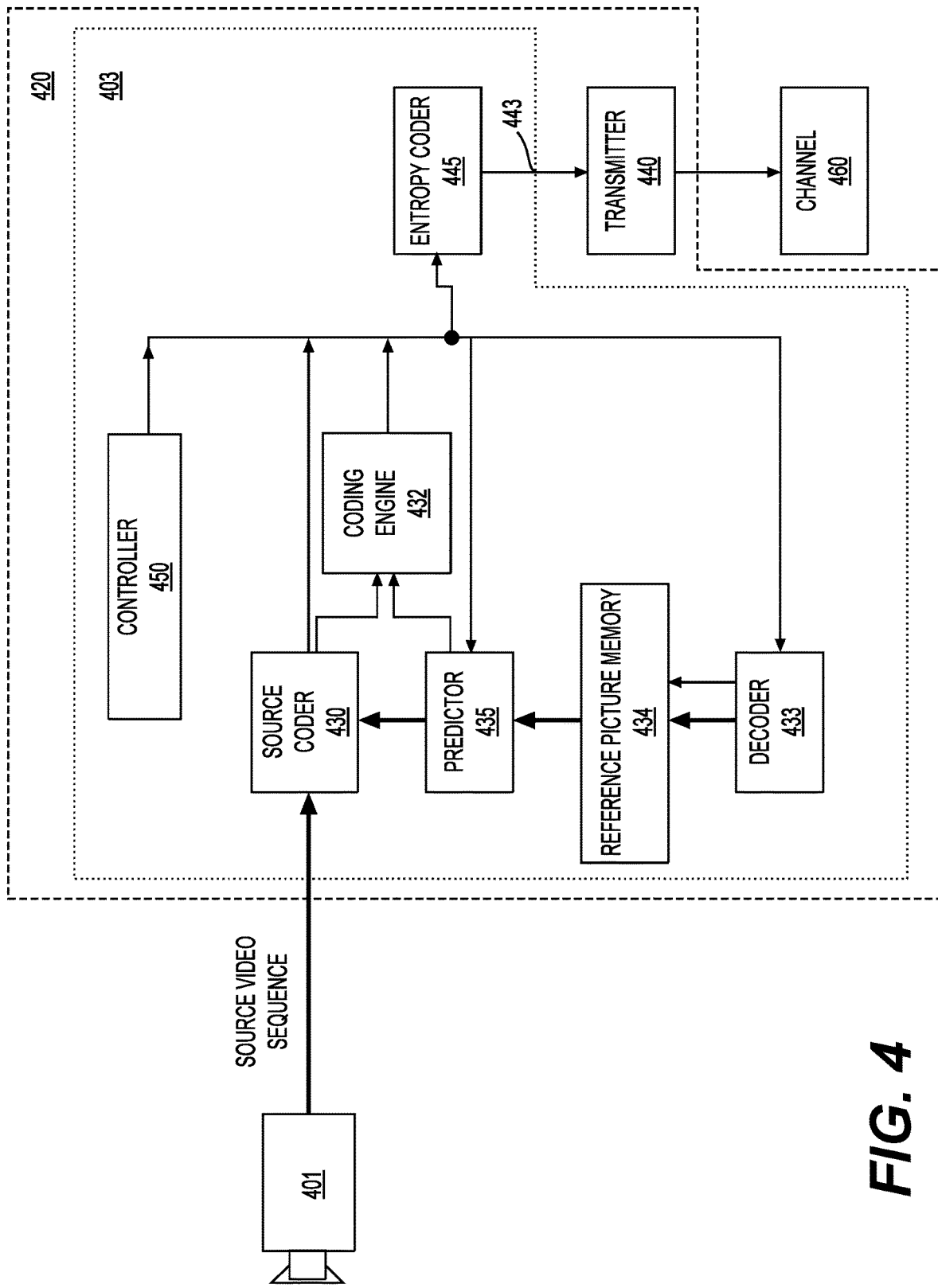
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
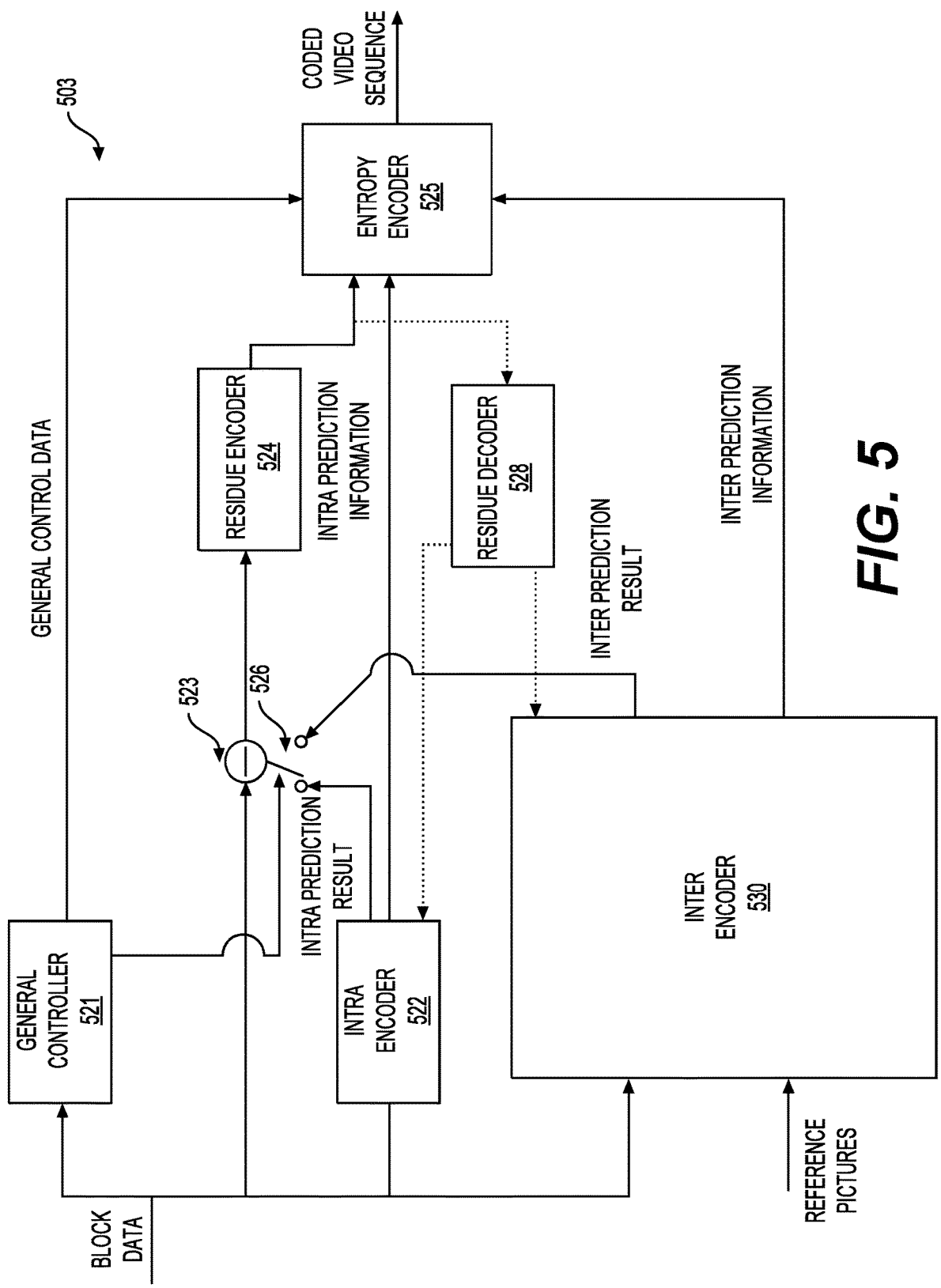
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
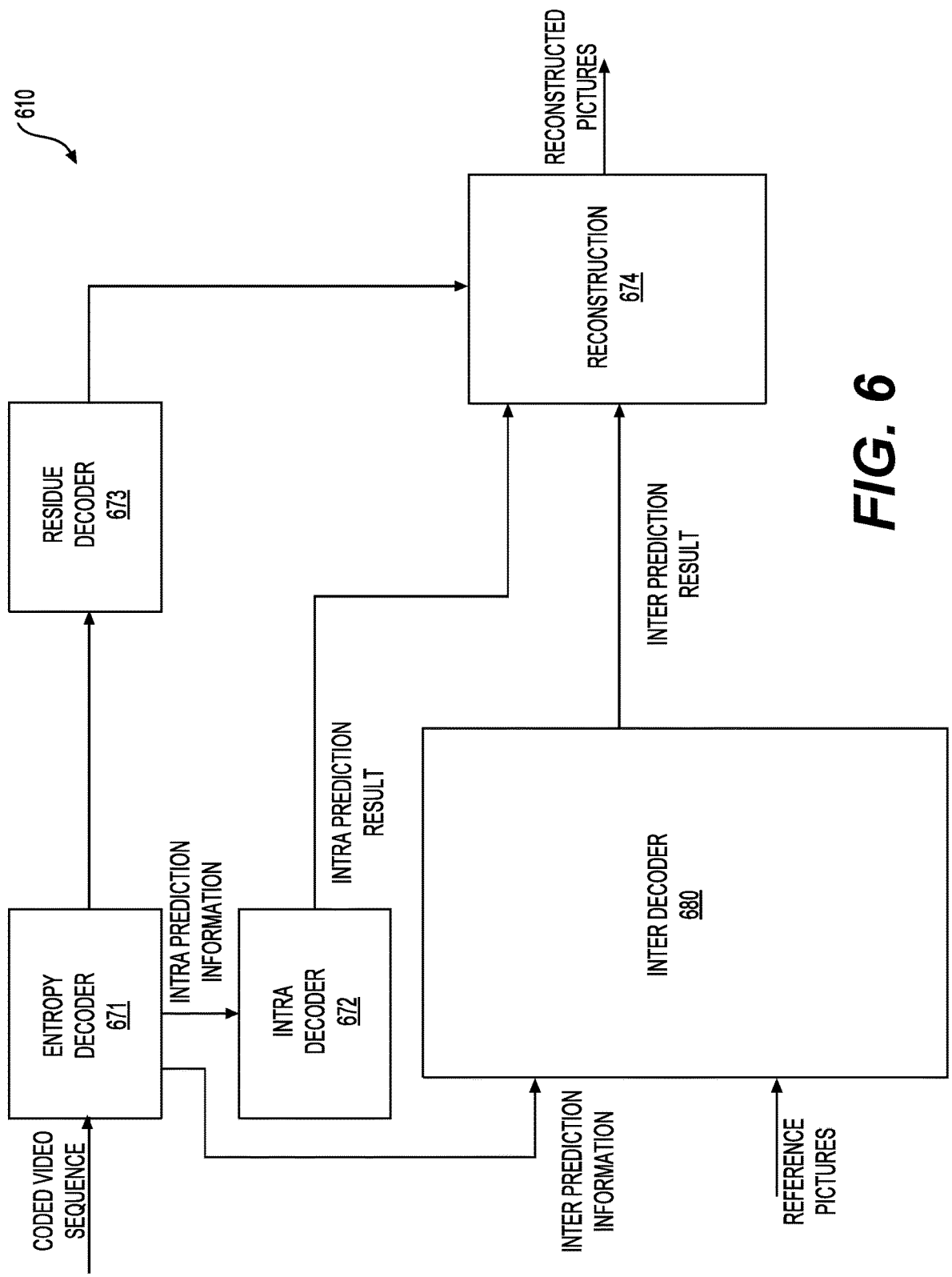
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

In a video coding process, quantization parameters (QPs) may need to be changed within a picture for rate control and perceptual quantization purposes, for example.

In VVC Draft 8, a QP can be controlled in a high-level syntax (or high-level control) such as a picture parameter set (PPS), a picture header (PH), or a slice header (SH), and can also be controlled in a low-level syntax such as a coding block or a transform block.

For a high level control of a luma QP, an initial QP value can be signaled in the PPS, and a flag can also be signaled in the PPS to indicate that an additional QP offset is either signaled in the PH or the SH. Therefore, a luma QP granularity can be achieved by adding the QP offset to the initial QP value. Table 1 illustrates exemplary luma QP related syntax elements signalled in PPS.

TABLE 1

| Luma QP related syntax elements in PPS | |
|---|---|
| | Descriptor |
| pic_parameter_set_rbsp( ) { | |
| ... | |
|    init_qp_minus26 | se(v) |
| ... | |
|    qp_delta_info_in_ph_flag | u(1) |
| ... | |
| } | |

As shown in Table 1, init_qp_minus26 plus 26 can specify an initial value of SliceQpY for each slice that refers to a corresponding PPS. The initial value of SliceQpY can be modified at the picture level when a non-zero value of ph_qp_delta is decoded or at the slice level when a non-zero value of slice_qp_delta is decoded. The value of init_qp_minus26 can be in a range of −(26+QpBdOffset) to +37, inclusive. In addition, qp_delta_info_inph_flag equal to 1 can specify that QP delta information is present in the PH syntax structure and not present in the slice headers, where the slice headers refer to the PPS that do not contain a PH syntax structure. qp_delta_info_inph_flag equal to 0 can specify that QP delta information is not present in the PH syntax structure and may be present in slice headers, where the slice headers refer to the PPS that does not contain a PH syntax structure.

Table 2 shows exemplary luma QP related syntax elements in a PH. As shown in Table 2, ph_qp_delta can specify the initial value of QpY that can be used for coding blocks in a picture until the initial value is modified by the value of CuQpDeltaVal in the coding unit layer. When qp_delta_info_in_ph_flag is equal to 1, the initial value of the quantization parameter QpY for all slices of the picture, which can be denoted as SliceQpY, can be derived in Equation (1):

$$SliceQpY = 26 + init\_qp\_minus26 + ph\_qp\_delta \qquad \text{Eq. (1)}$$

where the value of SliceQpY can be in the range of −QpBdOffset to +63, inclusive.

TABLE 2

| Luma QP related syntax elements in PH | |
|---|---|
| | Descriptor |
| picture_header_structure( ) { | |
| ... | |
|    if( qp_delta_info_in_ph_flag ) | |
|       ph_qp_delta | se(v) |
| ... | |
| } | |

Table 3 shows exemplary luma QP related syntax elements in SH. As shown in Table 3, slice_qp_delta can specify the initial value of QpY that is used for the coding blocks in the slice until the initial value is modified by the value of CuQpDeltaVal in the coding unit layer. When qp_delta_info_in_ph_flag is equal to 0, the initial value of the quantization parameter QpY for the slice, which can be denoted as SliceQpY, can be derived as follows in Equation (2):

$$\text{Slice}QpY = 26 + init\_qp\_minus26 + slice\_qp\_delta \qquad \text{Eq. (2)}$$

The value of SliceQpY can be in the range of −QpBdOffset to +63, inclusive. In VVC Draft 8, chroma QP values can be derived by adding chroma QP offsets to the mapped chroma value qPCb, qPCr, and qPCbCr. Those chroma QP offsets can both be signaled in a PPS and a SH but not in a PH.

TABLE 3

Luma QP related syntax elements in SH

| | Descriptor |
|---|---|
| slice_header( ) { | |
| ... | |
|     if( !qp_delta_info_in_ph_flag ) | |
|         slice_qp_delta | se(v) |
| ... | |
| } | |

Table 4 shows exemplary chroma QP offsets related syntax elements in a PPS. As shown in Table 4, pps_chroma_tool_offsets_present_flag equal to 1 can specify that chroma tool offsets related syntax elements are present in the PPS RBSP syntax structure. pps_chroma_tool_offsets_present_flag equal to 0 can specify that chroma tool offsets related syntax elements are not present in the PPS RBSP syntax structure. When ChromaArrayType is equal to 0, the value of pps_chroma_tool_offsets_present_flag can be equal to 0.

TABLE 4

Chroma QP offsets related syntax elements in PPS

| | Descriptor |
|---|---|
| pic_parameter_set_rbsp( ) { | |
| ... | |
|   pps_chroma_tool_offsets_present_flag | u(1) |
|   if( pps_chroma_tool_offsets_present_flag ) { | |
|     pps_cb_qp_offset | se(v) |
|     pps_cr_qp_offset | se(v) |
|     pps_joint_cbcr_qp_offset_present_flag | u(1) |
|     if( pps_joint_cbcr_qp_offset_present_flag) | |
|       pps_joint_cbcr_qp_offset_value | se(v) |
|     pps_slice_chroma_qp_offsets_present_flag | u(1) |
|     ... | |
|   } | |
| ... | |
| } | |

Still referring to Table 4, pps_cb_qp_offset and pps_cr_qp_offset can specify the offsets to the luma quantization parameter Qp'Y used for deriving Qp'Cb and Qp'Cr, respectively. The values of pps_cb_qp_offset and pps_cr_qp_offset can be in the range of −12 to +12, inclusive. When ChromaArrayType is equal to 0, pps_cb_qp_offset and pp_cr_qp_offset may not be used in the decoding process, and decoders accordingly can ignore the values of the pps_cb_qp_offset and pp_cr_qp_offset. When ChromaArrayType is not present, the values of pps_cb_qp_offset and pp_cr_qp_offset can be inferred to be equal to 0.

In Table 4, pps_joint_cbcr_qp_offset_present_flag equal to 1 can specify that pps_joint_cbcr_qp_offset_value and joint_cbcr_qp_offset_list[i] are present in the PPS RBSP syntax structure. pps_joint_cbcr_qp_offset_present_flag equal to 0 can specify that pps_joint_cbcr_qp_offset_value and joint_cbcr_qp_offset_list[i] are not present in the PPS RBSP syntax structure. When ChromaArrayType is equal to 0 or sps_joint_cbcr_enabled_flag is equal to 0, the value of pps_joint_cbcr_qp_offset_present_flag can be equal to 0. When ChromaArrayType is not present, the value of pps_joint_cbcr_qp_offset_present_flag is inferred to be equal to 0.

Further, pps_joint_cbcr_qp_offset_value can specify the offset to the luma quantization parameter QP'Y used for deriving Q'CbCr. The value of pps_joint_cbcr_qp_offset_value can be in the range of −12 to +12, inclusive. When ChromaArrayType is equal to 0 or sps_joint_cbcr_enabled_flag is equal to 0, pps_joint_cbcr_qp_offset_value may not be used in the decoding process, and decoders can ignore the value of pps_joint_cbcr_qp_offset_value. When pps_joint_cbcr_qp_offsetpresent_flag is equal to 0, pps_joint_cbcr_qp_offset_value may not be present and can be inferred to be equal to 0.

pps_slice_chroma_qp_offsets_present_flag equal to 1 can indicate that the slice_cb_qp_offset and slice_cr_qp_offset syntax elements are present in the associated slice headers. pps_slice_chroma_qp_offsets_present_flag equal to 0 can indicate that the slice_cb_qp_offset and slice_cr_qp_offset are not present in the associated slice headers. When presentChromaArrayType is equal to 0, the value of pps_slice_chroma_qp_offsets_present_flag can be inferred to be equal to 0.

Table 5 shows exemplary chroma QP offsets related syntax elements in a SH. As shown in Table 5, slice_cb_qp_offset can specify a difference to be added to the value of pps_cb_qp_offset when the value of the quantization parameter Qp'Cb is determined. The value of slice_cb_qp_offset can be in the range of −12 to +12, inclusive. When slice_cb_qp_offset is not present, it can be inferred to be equal to 0. The value of pps_cb_qp_offset+slice_cb_qp_offset can be in the range of −12 to +12, inclusive.

TABLE 5

Chroma QP offsets related syntax elements in SH

| | Descriptor |
|---|---|
| slice_header( ) { | |
| ... | |
|   if( pps_slice_chroma_qp_offsets_present_flag ) { | |
|     slice_cb_qp_offset | se(v) |
|     slice_cr_qp_off set | se(v) |
|     if( sps_joint_cbcr_enabled_flag ) | |
|       slice_joint_cbcr_qp_offset | se(v) |
|   } | |
| ... | |
| } | |

In Table 5, slice_cr_qp_offset can specify a difference to be added to the value of pp_cr_qp_offset when the value of the Qp'Cr quantization parameter is determined. The value of slice_cr_qp_offset can be in the range of −12 to +12, inclusive. When slice_cr_qp_offset is not present, it can be inferred to be equal to 0. The value of pp_cr_qp_offset+slice_cr_qp_offset can be in the range of −12 to +12, inclusive.

slice_joint_cbcr_qp_offset can specify a difference to be added to the value of pps_joint_cbcr_qp_offset_value when the value of the Qp'CbCr is determined. The value of slice_joint_cbcr_qp_offset can be in the range of −12 to +12, inclusive. When slice_joint_cbcr_qp_offset is not present, it can be inferred to be equal to 0. The value of pps_joint_cbcr_qp_offset_value+slice_joint_cbcr_qp_offset can be in the range of −12 to +12, inclusive.

In VVC Draft 8, the variable ChromaArrayType can depend on the chroma format sampling structure, which is specified through chroma_format_idc and separate_colour_plane_flag. Table 6 shows values of ChromaArrayType and corresponding chroma format identifications, chroma formats, and flags (e.g., separate_colour_plane_flag).

TABLE 6

Values of ChromaArrayType

| chroma_format_idc | separate_colour_plane_flag | Chroma format | ChromaArrayType |
| --- | --- | --- | --- |
| 0 | 0 | Monochrome | 0 |
| 1 | 0 | 4:2:0 | 1 |
| 2 | 0 | 4:2:2 | 2 |
| 3 | 0 | 4:4:4 | 3 |
| 3 | 1 | 4:4:4 | 0 |

As shown in Table 6, ChromaArrayType can be equal to 0 when ChromaArrayType is monochrome or is a chroma format 4:4:4 with separate_colour_plane_flag being equal to 1.

In VVC Draft 8, chroma QP granularity can only be achieved in a PPS or a SH. In the present disclosure, chroma QP offsets can be signalled in a PH in some embodiments. Examples of corresponding syntax elements that can be included as illustrated in Table 7.

TABLE 7

Syntax elements to signal chroma QP offsets in PH

| | Descriptor |
| --- | --- |
| picture_header_structure( ) { | |
| ... | |
| ph_cb_qp_offset | se(v) |
| ph_cr_qp_offset | se(v) |
| ... | |
| } | |

As show in Table 7, ph_cb_qp_offset and ph_cr_qp_offset can specify offsets to the luma quantization parameter Qp'Y used for deriving Qp'Cb and Qp'Cr, respectively. The values of ph_cb_qp_offset and ph_cr_qp_offset can be in the range of −12 to +12, inclusive. When ph_cb_qp_offset and ph_cr_qp_offset are not present, the values of ph_cb_qp_offset and ph_cr_qp_offset can be inferred to be equal to 0. The value of pps_cb_qp_offset+ph_cb_qp_offset can be in the range of −12 to +12, inclusive. The value of pp_cr_qp_offset+ph_cr_qp_offset can be in the range of −12 to +12, inclusive.

In an embodiment, chroma QP offsets can be conditionally signaled in a PH based on chroma color format. For example, when only ChromaArrayType is not equal to 0, ph_cb_qp_offset and ph_cr_qp_offset can be signaled. In other words, when no chroma component is present in the bitstream, ph_cb_qp_offset and ph_cr_qp_offset are not signaled. Examples of corresponding syntax elements are illustrated in Table 8.

TABLE 8

Syntax elements to signal chroma QP offsets in PH according to ChromaArrayType

| | Descriptor |
| --- | --- |
| picture_header_structure( ) { | |
| ... | |
| if (ChromaArrayType !=0) { | |

TABLE 8-continued

Syntax elements to signal chroma QP offsets in PH according to ChromaArrayType

| | Descriptor |
| --- | --- |
| ph_cb_qp_offset | se(v) |
| ph_cr_qp_offset | se(v) |
| ... | |
| } | |
| ... | |
| } | |

As shown in Table 8, ph_cb_qp_offset and ph_cr_qp_offset can specify the offsets to the luma quantization parameter Qp'Y used for deriving Qp'Cb and Qp'Cr, respectively. The values of ph_cb_qp_offset and ph_cr_qp_offset can be in the range of −12 to +12, inclusive. When ph_cb_qp_offset and ph_cr_qp_offset are not present, the values of ph_cb_qp_offset and ph_cr_qp_offset can be inferred to be equal to 0. The value of pps_cb_qp_offset+ph_cb_qp_offset can be in the range of −12 to +12, inclusive. The value of pp_cr_qp_offset+ph_cr_qp_offset can be in the range of −12 to +12, inclusive.

According to Tables 7 and 8, both QP offsets signaled in a PH and a SH can be applied to derive chroma QP values in order to achieve better granularity of a QP. In one embodiment, chroma QP values are derived as follows in Equations (3) and (4):

$$QP'_{Cb} = \text{Clip3}(-QpBd\text{Offset}, 63, qP_{Cb}+pp\text{-}s\_cb\_qp\_\text{offset}+ph\_cb\_qp\_\text{offset}+ \text{slice}\_cb\_qp\_\text{offset}+CuQp\text{Offset}_{Cb})+QpBd\text{Offset} \quad \text{Eq. (3)}$$

$$QP'_{Cr} = \text{Clip3}(-QpBd\text{Offset}, 63, qP_{Cr}+pps\_cr\_qp\_\text{offset}+ph\_cr\_qp\_\text{offset}+\text{slice}\_cr\_qp\_\text{offset}+ CuQp\text{Offset}_{Cr})+QpBd\text{Offset} \quad \text{Eq. (4)}$$

In Equations (3) and (4), Bd stands for bit depth (BitDepth) of the samples of the luma and chroma arrays, and QpBdOffset denotes the value of the luma and chroma quantization parameter range offset. BitDepth and QpBdOffset can be defined in Equations (5) and (6) respectively:

$$\text{BitDepth}=8+sps\_\text{bitdepth\_minus} \quad \text{Eq. (5)}$$

$$QpBd\text{Offset}=6*sps\_\text{bitdepth\_minus8} \quad \text{Eq. (6)}$$

As shown in Equation (3), a Cb quantization parameter (e.g., QP'cb) can be equal to a sum of a joint Cb offset and the quantization parameter range offset (e.g., QpBdOffset). The joint Cb offset can be determined based on a sum of a Cb offset of the chroma QP offsets in a PH level (e.g., ph_cb_qp_offset), a Cb component of the initial quantization parameter of the CU (e.g., qP$_{Cb}$), a Cb component of the quantization parameter offset of the CU in a PPS level (e.g., pps_cb_qp_offset), a Cb component of the quantization parameter offset of the CU in a SH level (e.g., slice_cb_qp_offset), and the Cb component of the coding unit quantization parameter offset of the CU (e.g., CuQpOffset$_{Cb}$). According to the function Clip3 (x, y, z), the joint Cb offset can be larger than or equal to a negative quantization parameter range offset (e.g., −QpBdOffset) and being less than or equal to 63.

Also, according to Equation (4), a Cr quantization parameter QP'cr can be equal to a sum of a joint Cr offset and the quantization parameter range offset (e.g., QpBdOffset). The joint Cr offset can be determined based on a sum of a Cr offset of the chroma QP offsets in a PH level (e.g., ph_cr_qp_offset), a Cr component of the initial quantization parameter of the CU (e.g., gP$_{Cr}$), a Cr component of the quantization parameter offset of the CU in a PPS level (e.g., pp_cr_qp_offset), a Cr component of the quantization parameter offset of the CU in a SH level (e.g., slice_cr_qp_offset), and the Cr component of the coding unit quantization parameter offset of the CU (e.g., CuQpOffset$_{Cr}$). According to the function Clip3 (x, y, z), the joint Cb offset can be larger than or equal to the negative quantization parameter range offset (e.g., −QpBdOffset) and being less than or equal to 63.

In an embodiment, a signal can be signalled to indicate either a QP offset is signaled in PH or SH in order to derive a chroma QP value. The flag can also be used to condition the QP offset value. In an example, the flag, which is denoted as chroma_qp_offset_info_in_ph_flag, can be signaled in a PPS, and the related syntax elements can be illustrated in Table 9 for example.

TABLE 9

Syntax elements to signal a flag
chroma_qp_offset_info_in_ph_flag in PPS

| | Descriptor |
|---|---|
| pic_parameter_set_rbsp( ) { | |
| ... | |
|   pps_chroma_tool_offsets_present flag | u(1) |
|   if( pps_chroma_tool_offsets_present_flag ) { | |
| ... | |
|     chroma_qp_offset_info_in_ph_flag | u(1) |
| ... | |
|   } | |
| ... | |
| } | |

As shown in Table 9, chroma_qp_offset_info_in_ph_flag equal to a first value (e.g., 1) can specify that chroma QP offset information is present in the PH syntax structure and not present in slice headers, where the slice headers refer to the PPS that do not contain a PH syntax structure. chroma_qp_offset_info_in_ph_flag equal to a second value (e.g., 0) can specify that QP delta information is not present in the PH syntax structure and may be present in slice headers, where the slice headers refer to the PPS that do not contain a PH syntax structure. When chroma_qp_offset_info_in_ph_ flag is not present, it can be inferred to be equal to 0.

Table 10 shows exemplary syntax elements to signal a QP offset in a PH.

TABLE 10 syntax elements to signal a QP offset in PH

| | Descriptor |
|---|---|
| picture_header_structure( ) { | |
| ... | |
|   if (ChromaArrayType !=0) { | |
|     if ( chroma_qp_offset_info_in_ph_flag ) { | |
|       ph_cb_qp_offset | se(v) |
|       ph_cr_qp_offset | se(v) |
|     } | |
|   } | |
| ... | |
| } | |

As shown in Table 10, when chroma_qp_offset_info_in_ph_flag is true or equal to the first value (e.g., 1), and ChromaArrayType is not equal to zero, ph_cb_qp_offset and ph_cr_qp_offset can be signaled. ph_cb_qp_offset and ph_cr_qp_offset can specify the offsets to the luma quantization parameter Qp'Y used for deriving Qp'Cb and Qp'Cr, respectively. The values of ph_cb_qp_offset and ph_cr_qp_offset can be in the range of −12 to +12, inclusive. When ph_cb_qp_offset and ph_cr_qp_offset are not present, the values of ph_cb_qp_offset and ph_cr_qp_offset can be inferred to be equal to 0. The value of pps_cb_qp_offset+ ph_cb_qp_offset can be in the range of −12 to +12, inclusive. The value of pp_cr_qp_offset+ph_cr_qp_offset can be in the range of −12 to +12, inclusive.

Table 11 shows exemplary syntax elements that can be used to signal a QP offset in a SH. As shown in Table 9, when chroma_qp_offset_info_in_ph_flag is not present or is equal to the second value (e.g., 0), and ChromaArrayType is not equal to zero, slice_cb_qp_offset and slice_cr_qp_offset can be signaled in the SH.

TABLE 11

Syntax elements to signal a QP offset in SH

| | Descriptor |
|---|---|
| slice_header( ) { | |
| ... | |
|   if (ChromaArrayType !=0) { | |
|     if ( !chroma_qp_offset_info_in_ph_flag) { | |
|       slice_cb_qp_offset | se(v) |
|       slice_cr_qp_offset | se(v) |
|     } | |
|   } | |
| ... | |
| } | |

According to Tables 10 and 11, QP offsets can be signaled either in a PH or a SH to derive chroma QP values to achieve different levels of QP granularity. In an example, chroma QP values can be derived as follows in Equations (7) and (8):

$$QP'_{Cb} = \text{Clip3}(-QpBdOffset, 63, qP_{Cb}+pps\_cb\_qp\_\text{offset}+(chroma\_qp\_offset\_info\_in\_ph\_flag ? ph\_cb\_qp\_\text{offset}:slice\_cb\_qp\_\text{offset})+CuQp\text{Offset}_{Cb})+QpBdOffset \quad \text{Eq. (7)}$$

$$QP'_{Cr} = \text{Clip3}(-QpBdOffset, 63, qP_{Cr}+pps\_cr\_qp\_\text{offset}+(chroma\_qp\_offset\_info\_in\_ph\_flag ? ph\_cr\_qp\_\text{offset}:slice\_cr\_qp\_\text{offset})+CuQp\text{Offset}_{Cr})+QpBdOffset \quad \text{Eq. (8)}$$

As shown in Equations (7) and (8), when chroma_qp_offset_info_in_ph_flag is true or equal to the first value (e.g., 1), QP offsets (or chroma QP offsets) in a PH (e.g., ph_cb_qp_offset and ph_cr_qp_offset) can be signaled. When chroma_qp_offset_info_in_ph_flag is not present or equal to the second value (e.g., 0), QP offsets (or chroma QP offsets) in a SH (e.g., slice_cb_qp_offset and slice_cr_qp_offset) can be signaled. Thus, depending on the value of chroma_qp_offset_info_in_ph_flag, only one QP offset is used to derive chroma QP values (e.g., $Qp'_{Cb}$ and $Qp'_{Cr}$).

Accordingly, when chroma_qp_offset_info_in_ph_flag is true or equal to the first value (e.g., 1), a Cb quantization parameter (e.g., $Qp'_{Cb}$) can be equal to a sum of a joint Cb offset and the quantization parameter range offset (e.g., QpBdOffset). The joint Cb offset can be determined based on a sum of the Cb offset of the chroma QP offsets in the PH level (e.g., ph_cb_qp_offset), the Cb component of the initial quantization parameter of the CU (e.g., $qP_{Cb}$), the Cb component of the quantization parameter offset of the CU in the PPS level (e.g., pps_cb_qp_offset), and the Cb component of the coding unit quantization parameter offset of the CU (e.g., $CuQpOffset_{Cb}$). The joint Cb offset can be determined based on the function Clip3 (x, y, z), and be larger than or equal to the negative quantization parameter range offset (e.g., −QpBdOffset) and be less than or equal to 63.

When chroma_qp_offset_info_in_ph_flag is true or equal to the first value (e.g., 1), a Cr quantization parameter (e.g., $Qp'_{Cr}$) can be equal to a sum of a joint Cr offset and the quantization parameter range offset (e.g., QpBdOffset). The joint Cr offset can be determined based on a sum of the Cr offset of the chroma QP offsets in the PH level (e.g., ph_cr_qp_offset), the Cr component of the initial quantization parameter of the CU (e.g., $qP_{Cr}$), the Cr component of the quantization parameter offset of the CU in the PPS level (e.g., pp_cr_qp_offset), and the Cr component of the coding unit quantization parameter offset of the CU (e.g., $CuQpOffset_{Cr}$). The joint Cr offset can be determined based on the function Clip3 (x, y, z), and be larger than or equal to a negative quantization parameter range offset (e.g., −QpBdOffset) and be less than or equal to 63.

When chroma_qp_offset_info_in_ph_flag is false or equal to the second value (e.g., 0), a Cb quantization parameter (e.g., $Qp'_{Cb}$) can be equal to a sum of a joint Cb offset and the quantization parameter range offset (e.g., QpBdOffset). The joint Cb offset can be determined based on a sum of a Cb offset of the chroma QP offsets of the CU in the SH level (e.g., slice_cb_qp_offset), the Cb component of the initial quantization parameter of the CU (e.g., $qP_{Cb}$), the Cb component of the quantization parameter offset of the CU in the PPS level (e.g., pps_cb_qp_offset), and the Cb component of the coding unit quantization parameter offset of the CU (e.g., $CuQpOffset_{Cb}$). The joint Cb offset can be determined based on the function Clip3 (x, y, z), and be larger than or equal to a negative quantization parameter range offset (e.g., −QpBdOffset) and be less than or equal to 63.

When chroma_qp_offset_info_in_ph_flag is false or equal to the second value (e.g., 0), a Cr quantization parameter (e.g., $Qp'_{Cr}$) can be equal to a sum of a joint Cr offset and the quantization parameter range offset (e.g., QpBdOffset). The joint Cr offset can be determined based on a sum of a Cr offset of the chroma QP offsets of the CU in the SH level (e.g., slice_cr_qp_offset), the Cr component of the initial quantization parameter of the CU (e.g., $qP_{Cr}$), the Cr component of the quantization parameter offset of the CU in the PPS level (e.g., pp_cr_qp_offset), and the Cr component of the coding unit quantization parameter offset of the CU (e.g., $CuQpOffset_{Cr}$). The joint Cr offset can be determined based on the function Clip3 (x, y, z), and be larger than or equal to a negative quantization parameter range offset (e.g., −QpBdOffset) and be less than or equal to 63.

In an embodiment, a QP offset of JCCR can be signalled in a PH. For example, exemplary corresponding syntax elements are shown in Table 12.

TABLE 12

Syntax elements to signal a QP offset of JCCR in PH

| | Descriptor |
|---|---|
| picture_header_structure( ) { | |
| ... | |
| ph_joint_cb_cr_qp_offset | se(v) |
| ... | |
| } | |

As shown in Table 12, ph_joint_cbcr_qp_offset can specify the offset to the luma quantization parameter Qp'Y used for deriving Qp'CbCr. The values of ph_joint_cbcr_qp_offset can be in the range of −12 to +12, inclusive. When not present, the values of ph_joint_cbcr_qp_offset can be inferred to be equal to 0. The value of pps_joint_cbcr_qp_offset+ph_joint_cbcr_qp_offset can be in the range of −12 to +12, inclusive.

In an embodiment, QP offsets of JCCR can be conditionally signaled in a PH based on chroma color format. For example, when only ChromaArrayType is not equal to 0, ph_joint_cbcr_qp_offset can be signaled. In other words, when no chroma component is present in the bitstream, ph_joint_cbcr_qp_offset is not signaled. Exemplary corresponding syntax elements are illustrated in Table 13.

TABLE 13

Syntax elements to signal a QP offset of JCCR in PH conditionally

| | Descriptor |
|---|---|
| picture_header_structure( ) { | |
| ... | |
|   if (ChromaArrayType !=0) { | |
|     ph_joint_cb_cr_qp_offset | se(v) |
|   } | |
| ... | |
| } | |

As shown in Table 13, when ChromaArrayType is not equal to zero, ph_joint_cbcr_qp_offset can be signalled. ph_joint_cbcr_qp_offset can specify the offset to the luma quantization parameter Qp'Y used for deriving Qp'CbCr. The values of ph_joint_cbcr_qp_offset can be in the range of −12 to +12, inclusive. When ph_joint_cbcr_qp_offset is not present, the values of ph_joint_cbcr_qp_offset can be inferred to be equal to 0. The value of pps_joint_cbcr_qp_offset+ph_joint_cbcr_qp_offset can be in the range of −12 to +12, inclusive.

According to Tables 12 and 13, the QP offset of JCCR that is signaled in a PH and a SH can be applied to derive a QP value of JCCR in order to achieve better granularity of a QP. For example, a QP value of JCCR can be derived as follows in Equation (9).

$$Qp'CbCr = \text{Clip3}(-QpBd\text{Offset}, 63, qPCbCr + pps\_joint\_cbcr\_qp\_\text{offset\_value} + ph\_joint\_cbcr\_qp\_\text{offset} + slice\_joint\_cbcr\_qp\_\text{offset} + CuQpOffsetCbCr) + QpBd\text{Offset} \quad \text{Eq.(9)}$$

According to Equation (9), a CbCr quantization parameter of the quantization parameters can be equal to a sum of a joint CbCr offset and the quantization parameter range offset (e.g., QpBdOffset). The joint CbCr offset can be determined based on a sum of the CbCr offset of the chroma QP offsets in the PH level (e.g., ph_joint_cbcr_qp_offset), the CbCr quantization parameter of the CU (e.g., qPCbCr), the CbCr quantization parameter offset of the CU in the PPS level (e.g., pps_joint_cbcr_qp_offset_value), the CbCr quantization parameter offset of the CU in the SH level (e.g., slice_joint_cbcr_qp_offset), and the CbCr coding unit quantization parameter offset of the CU (e.g., CuQpOffsetCbCr). The joint CbCr offset can be determined by the function Clip 3 (x, y, z) so as to be larger than or equal to the negative quantization parameter range offset (e.g., −QpBdOffset) and be less or equal to 63.

In an embodiment, QP offsets of JCCR can be signaled either in a PH or a SH to derive a chroma QP value according to a flag. The flag can also be applied to condition the QP offset value. For example, the flag can be defined as chroma_qp_offset_info_in_ph_flag. chroma_qp_offset_info_in_ph_flag equal to 1 can specify that chroma QP offsets (e.g., ph_cb_qp_offset, and ph_cr_qp_offset) and QP offset of JCCR information (e.g., ph_joint_cbcr_qp_offset) are present in the PH syntax structure and not present in slice headers, where the slice headers refer to the PPS that do not contain a PH syntax structure. chroma_qp_offset_info_in_ph_flag equal to 0 can specify that QP delta information is not present in the PH syntax structure and may be present in slice headers, where the slice header refer to the PPS that do not contain a PH syntax structure. When chroma_qp_offset_info_in_ph_flag is not present, it can be inferred to be equal to 0. Table 14 shows exemplary syntax elements to signal a QP offset of JCCR in a PH.

TABLE 14

Syntax elements to signal a QP offset of JCCR in PH

| | Descriptor |
|---|---|
| picture_header_structure( ) { | |
| ... | |
|     if (ChromaArrayType !=0) { | |
|         if ( chroma_qp_offset_info_in_ph_flag) { | |
|             ph_cb_qp_offset | se(v) |
|             ph_cr_qp_offset | se(v) |
|             ph_joint_cbcr_qp_offset | se(v) |
|         ... | |
|         } | |
|     } | |
| ... | |
| } | |

As shown in Table 14, when chroma_qp_offset_info_in_ph_flag is present or equal to the first value (e.g., 1), ph_joint_cbcr_qp_offset can be signalled, chroma_qp_offset_info_in_ph_flag can specify the offset to the luma quantization parameter Qp'Y used for deriving Qp'CbCr. The values of ph_joint_cbcr_qp_offset can be in the range of −12 to +12, inclusive. When ph_joint_cbcr_qp_offset is not present, the values of ph_joint_cbcr_qp_offset can be inferred to be equal to 0. The value of pps_joint_cbcr_qp_offset+ph_joint_cbcr_qp_offset can be in the range of −12 to +12, inclusive.

Table 15 shows exemplary syntax elements to signal a QP offset of JCCR in a SH. As shown in Table 15, when chroma_qp_offset_info_in_ph_flag is not present or equal to the second value (e.g., 0), slice_joint_cbcr_qp_offset can be signalled in the SH.

TABLE 15 syntax elements to signal a QP offset of JCCR in SH

| | Descriptor |
|---|---|
| slice_header( ) { | |
| ... | |
|   if (ChromaArrayType !=0) { | |
|     if ( !chroma_qp_offset_info_in_ph_flag) { | |
|       slice_cb_qp_offset | se(v) |
|       slice_cr_qp_offset | se(v) |
|       slice_joint_cbcr_qp_offset | se(v) |
|     ... | |
|     } | |
|   } | |
| ... | |
| } | |

According to Tables 14 and 15, QP offsets can be signaled either in a PH or a SH to derive a JCCR QP value to achieve a different level of QP granularity. For example, a CbCr component of a chroma QP value can be derived as follows in Equation (10).

$$Qp'CbCr = \text{Clip3}(-QpBd\text{Offset}, 63, qPCbCr + pps\_joint\_cbcr\_qp\_offset\_value + (\text{chroma\_qp\_offset\_info\_in\_ph\_flag} \text{?} ph\_joint\_cbcr\_qp\_offset : slice\_joint\_cbcr\_qp\_offset) + CuQp\text{Offset}CbCr) + QpBd\text{Offset} \quad \text{Eq. (10)}$$

As shown in Equation (10), when chroma_qp_offset_info_in_ph_flag is true or equal to the first value (e.g., 1), ph_joint_cbcr_qp_offset is signalled. When chroma_qp_offset_info_in_ph_flag is false or equal to the second value (e.g., 0), slice_joint_cbcr_qp_offset is signalled. Thus, depending on the value of chroma_qp_offset_info_in_ph_flag, only one QP offset is used to derive a JCCR QP value.

As shown in Equation (10), when chroma_qp_offset_info_in_ph_flag is true, or equal to the first value (e.g., 1), a CbCr quantization parameter (e.g. Qp'CbCr) can be equal to a sum of a joint CbCr offset and the quantization parameter range offset (e.g., QpBdOffset). The joint CbCr offset can be determined based on a sum of the CbCr offset of the chroma QP offsets in the PH level (e.g., ph_joint_cbcr_qp_offset), the CbCr quantization parameter of the CU (e.g., qPCbCr), the CbCr quantization parameter offset of the CU in the PPS level (e.g., pps_joint_cbcr_qp_offset_value), and the CbCr coding unit quantization parameter offset of the CU (e.g., CuQpOffsetCbCr) in response to the signal information being true. The joint CbCr offset can be determined by the function Clip 3(x, y, z) so as to be larger than or equal to the negative quantization parameter range offset (e.g., −QpBdOffset) and be less than or equal to 63.

When chroma_qp_offset_info_in_ph_flag is false or equal to the second value (e.g., 0), a CbCr quantization parameter (e.g. Qp'CbCr) can be equal to a sum of a joint CbCr offset and the quantization parameter range offset (e.g., QpBdOffset). The joint CbCr offset can be determined based on a sum of a CbCr offset of the chroma QP offsets of the CU in the SH level (e.g., slice_joint_cbcr_qp_offset), the CbCr quantization parameter of the CU (e.g., qPCbCr), the CbCr quantization parameter offset of the CU in the PPS level (e.g., pps_joint_cbcr_qp_offset_value), and the CbCr coding unit quantization parameter offset of the CU (e.g., CuQpOffsetCbCr) in response to the signal information being false. The joint CbCr offset can be determined by the function Clip 3( ) so as to be larger than or equal to the negative quantization parameter range offset (e.g., −QpBdOffset) and be less than or equal to 63.

Figure 7:
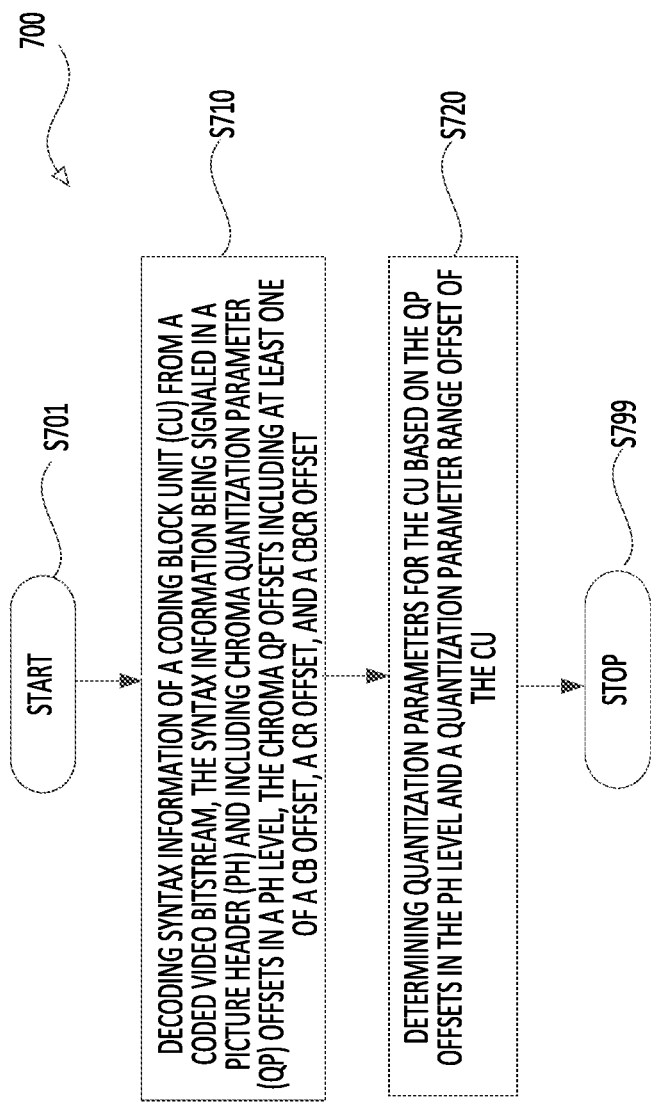
FIG. 7 shows a first flow chart outlining a process example according to some embodiments of the disclosure.
Figure 8:
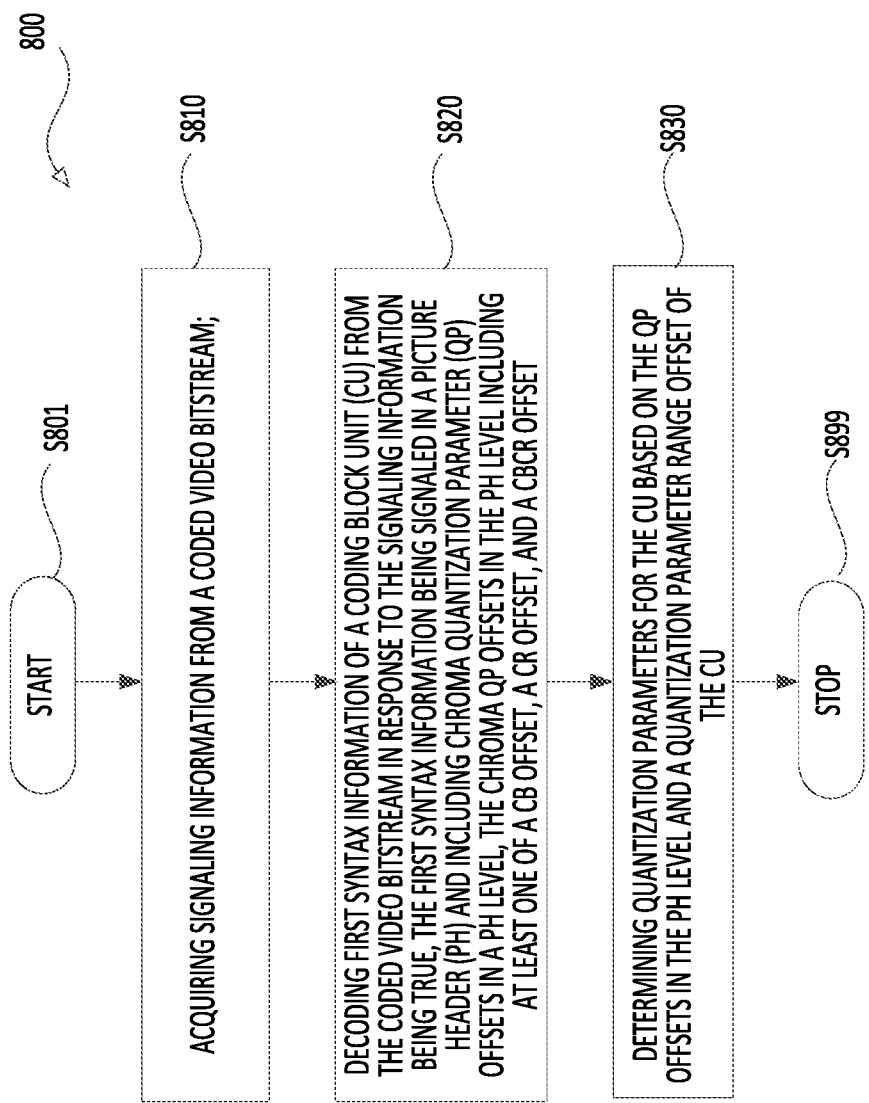
FIG. 8 shows a second flow chart outlining a process example according to some embodiments of the disclosure.

FIGS. 7 and 8 show flow charts outlining a process (700) and a process (800) according to embodiments of the disclosure. The processes (700) and (800) can be used in determining quantization parameters for a CU based on QP offsets in a PH level. In various embodiments, the processes (700) and (800) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the processes (700) and (800) are implemented in software instructions, thus when the processing circuitry executes the software instructions, the processing circuitry performs the processes (700) and (800).

As shown in FIG. 7, the process (700) starts at (S701) and proceeds to (S710).

At (S710), syntax information of a coding block unit (CU) can be decoded from a coded video bitstream. The syntax information can be signaled in a picture header (PH) and include chroma quantization parameter (QP) offsets in a PH level, where the chroma QP offsets can include at least one of a Cb offset, a Cr offset, and a CbCr offset.

In some embodiments, the syntax information can be signaled in the picture header (PH) in response to a chroma array type not being equal to zero.

At (S720), quantization parameters for the CU can be determined based on the chroma QP offsets in the PH level and a quantization parameter range offset of the CU.

In order to determine the quantization parameters for the CU, a Cb component of an initial quantization parameter of the CU can be obtained. A Cr component of the initial quantization parameter of the CU can be obtained. A Cb component of a quantization parameter offset of the CU in a picture parameter set (PPS) level can be obtained. A Cr component of the quantization parameter offset of the CU in the PPS level can be obtained. A Cb component of a quantization parameter offset of the CU in a slice header (SH) level can be obtained. A Cr component of the quantization parameter offset of the CU in the SH level can be obtained. A Cb component of a coding unit quantization parameter offset of the CU can be obtained. A Cr component of the coding unit quantization parameter offset of the CU can be obtained.

In some embodiments, a Cb quantization parameter of the quantization parameters can be determined based on the QP offsets in the PH level and the quantization parameter range offset of the CU. The Cb quantization parameter can be equal to a sum of a joint Cb offset and the quantization parameter range offset. The joint Cb offset can be determined based on a sum of the Cb offset of the chroma QP offsets in the PH level, the Cb component of the initial quantization parameter of the CU, the Cb component of the quantization parameter offset of the CU in the PPS level, the Cb component of the quantization parameter offset of the CU in the SH level, and the Cb component of the coding unit quantization parameter offset of the CU. The joint Cb offset can be larger than or equal to a negative quantization parameter range offset and be less than or equal to 63.

In addition, a Cr quantization parameter of the quantization parameters can be determined based on the QP offsets in the PH level and the quantization parameter range offset of the CU. The Cr quantization parameter can be equal to a sum of a joint Cr offset and the quantization parameter range offset. The joint Cr offset can be determined based on a sum of the Cr offset of the chroma QP offsets in the PH level, the Cr component of the initial quantization parameter of the CU, the Cr component of the quantization parameter offset of the CU in the PPS level, the Cr component of the quantization parameter offset of the CU in the SH level, and the Cr component of the coding unit quantization parameter offset of the CU, where the joint Cr offset can be larger than or equal to a negative quantization parameter range offset and be less than or equal to 63.

In some embodiments, a CbCr quantization parameter of the CU can be determined. A CbCr quantization parameter offset of the CU in a picture parameter set (PPS) level can be obtained. A CbCr quantization parameter offset of the CU in a slice header (SH) level can be obtained. A CbCr coding unit quantization parameter offset of the CU can be obtained.

In some embodiments, a CbCr quantization parameter of the quantization parameters can be determined based on the QP offsets in the PH level and the quantization parameter range offset of the CU. The CbCr quantization parameter can be equal to a sum of a joint CbCr offset and the quantization parameter range offset. The joint CbCr offset can be determined based on a sum of the CbCr offset of the chroma QP offsets in the PH level, the CbCr quantization parameter of the CU, the CbCr quantization parameter offset of the CU in the PPS level, the CbCr quantization parameter offset of the CU in the SH level, and the CbCr coding unit quantization parameter offset of the CU. The joint CbCr offset can be larger than or equal to a negative quantization parameter range offset and be less or equal to 63.

In some embodiments, a sum of the Cb component of the quantization parameter offset of the CU in the PPS level and the Cb offset of the chroma QP offsets in the PH level can be in a range of −12 and +12. In addition, a sum of the Cr component of the quantization parameter offset of the CU in the PPS level and the Cr offset of the chroma QP offsets in the PH level can be in a range of −12 and +12. A sum of a CbCr quantization parameter offset of the CU in the PPS level and the CbCr offset of the chroma QP offsets in the PH level can be in a range of −12 and +12.

As shown in FIG. 8, the process (800) starts at (S801) and proceeds to (S810).

At (S810), signaling information from a coded video bitstream can be acquired.

At (S820), first syntax information of a coding block unit (CU) from the coded video bitstream can be decoded in response to the signaling information being a first value. The first syntax information can be signaled in a picture header (PH) and include chroma quantization parameter (QP) offsets in a PH level. The chroma QP offsets in the PH level can include at least one of a Cb offset, a Cr offset, and a CbCr offset.

In some embodiments, second syntax information of the CU can be decoded from the coded video bitstream in response to the signaling information being a second value. The second syntax information can be signaled in a slice header (SH) and include chroma quantization parameter (QP) offsets in a SH level. The chroma QP offsets in the SH level can include at least one of a Cb offset, a Cr offset, and a CbCr offset. The quantization parameters for the CU can be further determined based on the QP offsets in the SH level and the quantization parameter range offset of the CU.

In some embodiments, the first syntax information can be signaled in the picture header (PH) in response to a chroma array type not being monochrome or not being a chroma format 4:4:4 with a separate color plane flag equal to 1. The chroma type can be determined based on chroma array type information (e.g., ChromaArrayType value equal to 0), as illustrated in Table 6 for example.

In some embodiments, the second syntax information can be signaled in the SH in response to the chroma array type not being monochrome or not being the chroma format 4:4;4 with the separate color plane flag equal to 1. The chroma type can be determined based on chroma array type information (e.g., ChromaArrayType value equal to 0), as illustrated in Table 6 for example.

At (S830), quantization parameters for the CU can be subsequently determined based on the QP offsets in the PH level and a quantization parameter range offset of the CU.

In order to determine the quantization parameters for the CU, a Cb component of an initial quantization parameter of the CU can be obtained. A Cr component of the initial quantization parameter of the CU can be obtained. A Cb component of a quantization parameter offset of the CU in a picture parameter set (PPS) level can be obtained. A Cr component of the quantization parameter offset of the CU in the PPS level can be obtained. A Cb component of a coding unit quantization parameter offset of the CU can be obtained. A Cr component of the coding unit quantization parameter offset of the CU can be obtained.

In some embodiments, a Cb quantization parameter can be determined based on the QP offsets in the PH level and the quantization parameter range offset of the CU. The Cb quantization parameter can be equal to a sum of a joint Cb offset and the quantization parameter range offset. The joint Cb offset can be determined based on a sum of the Cb offset of the chroma QP offsets in the PH level, the Cb component of the initial quantization parameter of the CU, the Cb component of the quantization parameter offset of the CU in the PPS level, and the Cb component of the coding unit quantization parameter offset of the CU in response to the signaling information being the first value. The joint Cb offset can be larger than or equal to a negative quantization parameter range offset and be less than or equal to 63.

In addition, a Cr quantization parameter can be determined based on the QP offsets in the PH level and the quantization parameter range offset of the CU. The Cr quantization parameter can be equal to a sum of a joint Cr offset and the quantization parameter range offset. The joint Cr offset can be determined based on a sum of the Cr offset of the chroma QP offsets in the PH level, the Cr component of the initial quantization parameter of the CU, the Cr component of the quantization parameter offset of the CU in the PPS level, and the Cr component of the coding unit quantization parameter offset of the CU in response to the signaling information being the first value. The joint Cr offset can be larger than or equal to a negative quantization parameter range offset and be less than or equal to 63.

Moreover, a CbCr quantization parameter of the CU can be obtained. A CbCr quantization parameter offset of the CU in a picture parameter set (PPS) level can be obtained. A CbCr coding unit quantization parameter offset of the CU can be obtained.

In some embodiments, a CbCr quantization parameter can be determined based on the QP offsets in the PH level and the quantization parameter range offset of the CU. The CbCr quantization parameter can be equal to a sum of a joint CbCr offset and the quantization parameter range offset. The joint CbCr offset can be determined based on a sum of the CbCr offset of the chroma QP offsets in the PH level, the CbCr quantization parameter of the CU, the CbCr quantization parameter offset of the CU in the PPS level, and the CbCr coding unit quantization parameter offset of the CU in response to the signal information being the first value. The joint CbCr offset can be larger than or equal to a negative quantization parameter range offset and being less than or equal to 63.

In some embodiments, a Cb quantization parameter can be determined based on the chroma QP offsets in the SH level and the quantization parameter range offset of the CU. The Cb quantization parameter can be equal to a sum of a joint Cb offset and the quantization parameter range offset. The joint Cb offset can be determined based on a sum of the Cb offset of the chroma QP offsets of the CU in the SH level, the Cb component of the initial quantization parameter of the CU, the Cb component of the quantization parameter offset of the CU in the PPS level, and the Cb component of the coding unit quantization parameter offset of the CU in response to the signaling information being the second value. The joint Cb offset can be larger than or equal to a negative quantization parameter range offset and be less than or equal to 63.

In some embodiments, a Cr quantization parameter can be determined based on the chroma QP offsets in the SH level and the quantization parameter range offset of the CU. The Cr quantization parameter can be equal to a sum of a joint Cr offset and the quantization parameter range offset. The joint Cr offset can be determined based on a sum of the Cr offset of the chroma QP offsets of the CU in the SH level, the Cr component of the initial quantization parameter of the CU, the Cr component of the quantization parameter offset of the CU in the PPS level, and the Cr component of the coding unit quantization parameter offset of the CU in response to being the signaling information being the second value. The joint Cr offset can be larger than or equal to a negative quantization parameter range offset and be less than or equal to 63.

In addition, a CbCr quantization parameter based on the chroma QP offsets in the SH level and the quantization parameter range offset of the CU, wherein: the CbCr quantization parameter is equal to a sum of a joint CbCr offset and the quantization parameter range offset, and the joint CbCr offset can be determined based on a sum of the CbCr offset of the chroma QP offsets of the CU in the SH level, the CbCr quantization parameter of the CU, the CbCr quantization parameter offset of the CU in the PPS level, and the CbCr coding unit quantization parameter offset of the CU in response to the signaling information being the second value. The joint CbCr offset can be larger than or equal to a negative quantization parameter range offset and be less than or equal to 63.

It should be noted that methods in the present disclosure can be used separately or combined in any order. Further, each of the methods (or embodiments), encoder, and decoder can be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 9 shows a computer system (1500) suitable for implementing certain embodiments (e.g., processes (700) and (800) of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
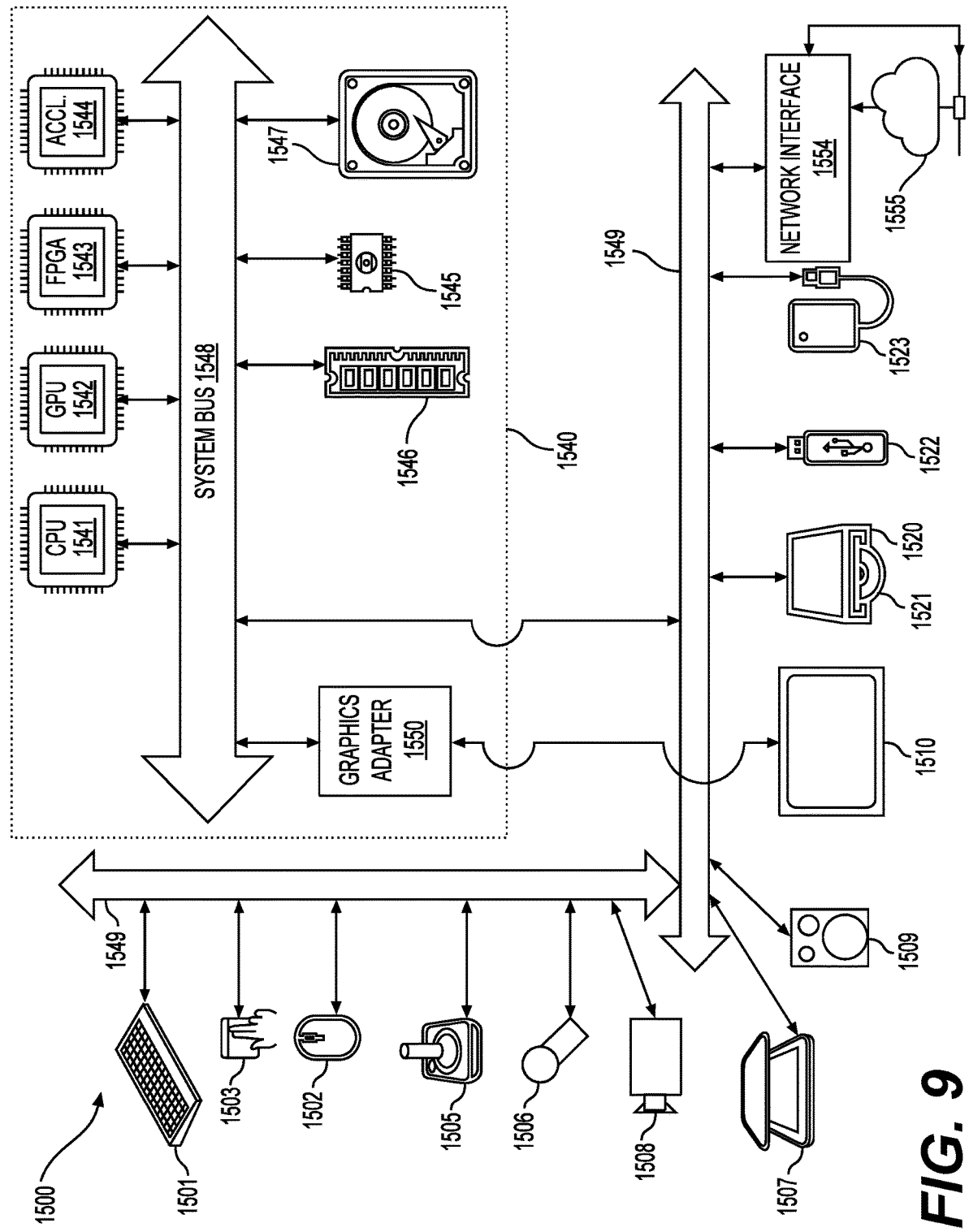
FIG. 9 is a schematic illustration of a computer system in accordance with an embodiment.

The components shown in FIG. 9 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
HEVC: High Efficiency Video Coding
HDR: High Dynamic Range
SDR: Standard Dynamic Range
VVC: Versatile Video Coding
JVET: Joint Video Exploration Team
TU: Transform Unit
SPS: Sequence Parameter Setting
PPS: Picture Parameter Setting
PH: Picture Header
SH: Slice Header
QP: Quantization Parameter
JCCR: Joint Cb Cr Residual coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding performed in a video decoder, the method comprising:
    decoding syntax information of a coding unit (CU) from a coded video bitstream, the syntax information being signaled in a picture header (PH) and including chroma quantization parameter (QP) offsets in a PH level, the chroma QP offsets in the PH level including at least one of a Cb offset, a Cr offset, and a CbCr offset; and
    determining quantization parameters for the CU based on joint chroma QP offsets signaled at a plurality levels in the coded video bitstream and a quantization parameter range offset of the CU, the joint chroma QP offsets including the chroma QP offsets in the PH level,
    wherein the syntax information is signaled in the PH in response to a chroma array type not being monochrome or not being a chroma format 4:4:4 with a separate color plane flag equal to 1.

2. The method of claim 1, wherein the determining the quantization parameters for the CU comprises:
    obtaining a Cb component of an initial quantization parameter of the CU;
    obtaining a Cr component of the initial quantization parameter of the CU;
    obtaining a Cb component of a quantization parameter offset of the CU in a picture parameter set (PPS) level;
    obtaining a Cr component of the quantization parameter offset of the CU in the PPS level;
    obtaining a Cb component of a quantization parameter offset of the CU in a slice header (SH) level;
    obtaining a Cr component of the quantization parameter offset of the CU in the SH level;
    obtaining a Cb component of a coding unit quantization parameter offset of the CU; and
    obtaining a Cr component of the coding unit quantization parameter offset of the CU.

3. The method of claim 2, wherein the determining the quantization parameters for the CU comprises:
    determining a Cb quantization parameter of the quantization parameters to be equal to a sum of a joint Cb offset of the joint chroma QP offsets and the quantization parameter range offset, wherein
    the joint Cb offset of the joint chroma QP offsets is based on a sum of the Cb offset of the chroma QP offsets in the PH level, the Cb component of the initial quantization parameter of the CU, the Cb component of the quantization parameter offset of the CU in the PPS level, the Cb component of the quantization parameter offset of the CU in the SH level, and the Cb component of the coding unit quantization parameter offset of the CU, the joint Cb offset of the joint chroma QP offsets being larger than or equal to a negative quantization parameter range offset and being less than or equal to 63.

4. The method of claim 2, wherein the determining the quantization parameters for the CU comprises:
    determining a Cr quantization parameter of the quantization parameters to be equal to a sum of a joint Cr offset of the joint chroma QP offsets and the quantization parameter range offset, wherein
    the joint Cr offset of the joint chroma QP offsets is based on a sum of the Cr offset of the chroma QP offsets in the PH level, the Cr component of the initial quantization parameter of the CU, the Cr component of the quantization parameter offset of the CU in the PPS level, the Cr component of the quantization parameter offset of the CU in the SH level, and the Cr component of the coding unit quantization parameter offset of the CU, the joint Cr offset of the joint chroma QP offsets being larger than or equal to a negative quantization parameter range offset and being less than or equal to 63.

5. The method of claim 1, wherein the determining the quantization parameters for the CU comprises:
    obtaining a CbCr quantization parameter of the CU;
    obtaining a CbCr quantization parameter offset of the CU in a picture parameter set (PPS) level;
    obtaining a CbCr quantization parameter offset of the CU in a slice header (SH) level; and
    obtaining a CbCr coding unit quantization parameter offset of the CU.

6. The method of claim 5, wherein the determining the quantization parameters for the CU comprises:
    determining a CbCr quantization parameter of the quantization parameters to be equal to a sum of a joint CbCr offset of the joint chroma QP offsets and the quantization parameter range offset, wherein
    the joint CbCr offset of the joint chroma QP offsets is based on a sum of the CbCr offset of the chroma QP offsets in the PH level, the CbCr quantization parameter of the CU, the CbCr quantization parameter offset of the CU in the PPS level, the CbCr quantization parameter offset of the CU in the SH level, and the CbCr coding unit quantization parameter offset of the CU, the joint CbCr offset of the joint chroma QP offsets being larger than or equal to a negative quantization parameter range offset and being less or equal to 63.

7. The method of claim 2, wherein:
a sum of the Cb component of the quantization parameter offset of the CU in the PPS level and the Cb offset of the chroma QP offsets in the PH level is in a range of −12 and +12,
a sum of the Cr component of the quantization parameter offset of the CU in the PPS level and the Cr offset of the chroma QP offsets in the PH level is in a range of −12 and +12, and
a sum of a CbCr quantization parameter offset of the CU in the PPS level and the CbCr offset of the chroma QP offsets in the PH level is in a range of −12 and +12.

8. The method of claim 1, wherein the joint chroma QP offsets further includes an initial quantization parameter of the CU, a quantization parameter offset of the CU in a picture parameter setting (PPS) level, a quantization parameter offset of the CU in a slice header (SH) level, and a coding unit quantization parameter offset of the CU.

9. A method of video decoding performed in a video decoder, the method comprising:
acquiring signaling information from a coded video bitstream;
decoding first syntax information of a coding unit (CU) from the coded video bitstream in response to the signaling information being a first value, the first syntax information being signaled in a picture header (PH) and including chroma quantization parameter (QP) offsets in a PH level, the chroma QP offsets in the PH level including at least one of a Cb offset, a Cr offset, and a CbCr offset; and
determining quantization parameters for the CU based on joint chroma QP offsets signaled at a plurality levels in the coded video bitstream and a quantization parameter range offset of the CU, the joint chroma QP offsets including the chroma QP offsets in the PH level in response to the signaling information being the first value,
wherein the syntax information is signaled in the PH in response to a chroma array type not being monochrome or not being a chroma format 4:4:4 with a separate color plane flag equal to 1.

10. The method of claim 9, further comprising:
decoding second syntax information of the CU from the coded video bitstream in response to the signaling information being a second value, the second syntax information being signaled in a slice header (SH) and including chroma QP offsets in a SH level, the chroma QP offsets in the SH level including at least one of a Cb offset, a Cr offset, and a CbCr offset; and
determining the quantization parameters for the CU based on the joint chroma QP offsets and the quantization parameter range offset of the CU, the joint chroma QP offsets including the chroma QP offsets in the SH level in response to the signaling information being the second value.

11. The method of claim 10, wherein:
the first syntax information is signaled in the picture header (PH) in response to a chroma array type not being monochrome and not being a chroma format 4:4:4 with a separate color plane flag equal to 1, and
the second syntax information is signaled in the SH in response to the chroma array type not being monochrome and not being the chroma format 4:4:4 with the separate color plane flag equal to 1.

12. The method of claim 10, wherein the determining the quantization parameters for the CU comprises:
obtaining a Cb component of an initial quantization parameter of the CU;
obtaining a Cr component of the initial quantization parameter of the CU;
obtaining a Cb component of a quantization parameter offset of the CU in a picture parameter set (PPS) level;
obtaining the Cr component of the quantization parameter offset of the CU in the SH level;
obtaining a Cb component of a coding unit quantization parameter offset of the CU; and
obtaining a Cr component of the coding unit quantization parameter offset of the CU.

13. The method of claim 12, wherein the determining the quantization parameters for the CU comprises:
determining a Cb quantization parameter of the quantization parameters to be equal to a sum of a joint Cb offset of the joint chroma QP offsets and the quantization parameter range offset, wherein
the joint Cb offset of the joint chroma QP offsets is based on a sum of the Cb offset of the chroma QP offsets in the PH level, the Cb component of the initial quantization parameter of the CU, the Cb component of the quantization parameter offset of the CU in the PPS level, and the Cb component of the coding unit quantization parameter offset of the CU in response to the signaling information being the first value, the joint Cb offset being larger than or equal to a negative quantization parameter range offset and being less than or equal to 63.

14. The method of claim 12, wherein the determining the quantization parameters for the CU comprises:
determining a Cr quantization parameter of the quantization parameters to be equal to a sum of a joint Cr offset of the joint chroma QP offsets and the quantization parameter range offset, wherein
the joint Cr offset of the joint chroma QP offsets is based on a sum of the Cr offset of the chroma QP offsets in the PH level, the Cr component of the initial quantization parameter of the CU, the Cr component of the quantization parameter offset of the CU in the PPS level, and the Cr component of the coding unit quantization parameter offset of the CU in response to the signaling information being the first value, the joint Cr offset being larger than or equal to a negative quantization parameter range offset and being less than or equal to 63.

15. The method of claim 10, wherein the determining the quantization parameters for the CU comprises:
obtaining a CbCr quantization parameter of the CU;
obtaining a CbCr quantization parameter offset of the CU in a picture parameter set (PPS) level; and
obtaining a CbCr coding unit quantization parameter offset of the CU.

16. The method of claim 15, wherein the determining the quantization parameters for the CU comprises:
determining a CbCr quantization parameter of the quantization parameters to be equal to a sum of a joint CbCr offset of the joint chroma QP offsets and the quantization parameter range offset, wherein the joint CbCr offset of the joint chroma QP offsets is based on a sum of the CbCr offset of the chroma QP offsets in the PH level, the CbCr quantization parameter of the CU, the CbCr quantization parameter offset of the CU in the PPS level, and the CbCr coding unit quantization parameter offset of the CU in response to the signaling information being the first value, the joint CbCr offset being larger than or equal to a negative quantization parameter range offset and being less than or equal to 63.

17. The method of claim 12, wherein the determining the quantization parameters for the CU comprises:
  determining a Cb quantization parameter of the quantization parameters to be equal to a sum of a joint Cb offset of the joint chroma QP offsets and the quantization parameter range offset, wherein
  the joint Cb offset of the joint chroma QP offsets is based on a sum of the Cb offset of the chroma QP offsets of the CU in the SH level, the Cb component of the initial quantization parameter of the CU, the Cb component of the quantization parameter offset of the CU in the PPS level, and the Cb component of the coding unit quantization parameter offset of the CU in response to the signaling information being the second value, the joint Cb offset being larger than or equal to a negative quantization parameter range offset and being less than or equal to 63.

18. The method of claim 12, wherein the determining the quantization parameters for the CU comprises:
  determining a Cr quantization parameter of the quantization parameters to be equal to a sum of a joint Cr offset of the joint chroma QP offsets and the quantization parameter range offset, wherein
  the joint Cr offset of the joint chroma QP offsets is based on a sum of the Cr offset of the chroma QP offsets of the CU in the SH level, the Cr component of the initial quantization parameter of the CU, the Cr component of the quantization parameter offset of the CU in the PPS level, and the Cr component of the coding unit quantization parameter offset of the CU in response to being the signaling information being the second value, the joint Cr offset being larger than or equal to a negative quantization parameter range offset and being less than or equal to 63.

19. The method of claim 15, wherein the determining the quantization parameters for the CU comprises:
  determining a CbCr quantization parameter of the quantization parameters to be equal to a sum of a joint CbCr offset of the joint chroma QP offsets and the quantization parameter range offset, wherein
  the joint CbCr offset of the joint chroma QP offsets is based on a sum of the CbCr offset of the chroma QP offsets of the CU in the SH level, the CbCr quantization parameter of the CU, the CbCr quantization parameter offset of the CU in the PPS level, and the CbCr coding unit quantization parameter offset of the CU in response to the signaling information being the second value, the joint CbCr offset being larger than or equal to a negative quantization parameter range offset and being less than or equal to 63.

20. An apparatus, comprising:
  processing circuitry configured to:
    decode syntax information of a coding unit (CU) from a coded video bitstream, the syntax information being signaled in a picture header (PH) and including chroma quantization parameter (QP) offsets in a PH level, the chroma QP offsets in the PH level including at least one of a Cb offset, a Cr offset, and a CbCr offset; and
  determine quantization parameters for the CU based on joint chroma QP offsets signaled at a plurality levels in the coded video bitstream and a quantization parameter range offset of the CU, the joint chroma QP offsets including the chroma QP offsets in the PH level,
  wherein the syntax information is signaled in the PH in response to a chroma array type not being monochrome or not being a chroma format 4:4:4 with a separate color plane flag equal to 1.

* * * * *